United States Patent [19]

Roller

[11] Patent Number: 4,889,213

[45] Date of Patent: Dec. 26, 1989

[54] COMPLIANCE BRAKE FOR AN INTERNAL COMBUSTION ENGINE POWERED IMPLEMENT

[75] Inventor: Lee E. Roller, Newburg, Wis.

[73] Assignee: Tecumseh Products Company, Tecumseh, Mich.

[21] Appl. No.: 237,293

[22] Filed: Aug. 26, 1988

[51] Int. Cl.[4] ............................................. F16D 51/12
[52] U.S. Cl. ................................. 192/1.44; 192/1.36; 56/11.3; 188/78; 188/166
[58] Field of Search ............................. 142/1.36, 1.44; 56/10.2, 10.8, 11.3; 188/78, 166, 167

[56] References Cited

U.S. PATENT DOCUMENTS

| | | | |
|---|---|---|---|
| 1,033,519 | 7/1912 | Banzhof | 192/1.49 |
| 3,228,177 | 1/1966 | Coates | 192/1.44 |
| 3,290,087 | 12/1966 | Haas | 56/10.5 |
| 4,221,108 | 9/1980 | Owens | 56/11.3 |
| 4,394,893 | 7/1983 | Kronich et al. | 192/1.44 |
| 4,419,857 | 12/1983 | Smith | 56/11.3 |
| 4,519,486 | 5/1985 | Hermanson | 192/1.44 |
| 4,757,885 | 7/1988 | Kronich et al. | 192/1.4 |
| 4,760,685 | 8/1988 | Smith | 56/10.8 |

Primary Examiner—Rodney H. Bonck
Assistant Examiner—Nicholas Whitelaw
Attorney, Agent, or Firm—Albert L. Jeffers; John F. Hoffman; Anthony Niewyk

[57] ABSTRACT

A safety device for an internal combustion engine powered implement and for disabling the operation of the internal combustion engine by means of a brake. The safety device includes a braking lever and a control lever which are both mounted on a single pivot member. Two springs are provided, the first of which normally urges the braking lever into contact with the flywheel of the internal combustion engine to prevent rotation thereof. The second spring biases the control lever into a rest position wherein the deadman control lever assumes its normal non-operated position and allows adjustment of control effort. The braking lever and control lever are mounted on the pivoting member by means of bushings to permit independent pivoting movement of the levers when the deadman lever is operated. The control lever contacts the braking lever by means of an abutment surface thereby rotating the braking lever out of contact with the flywheel and permitting the engine to operate. The braking lever also includes a protrusion for contacting an ignition circuit switch whereby the ignition circuit of the engine is also disabled in the rest position of the deadman control lever.

23 Claims, 4 Drawing Sheets

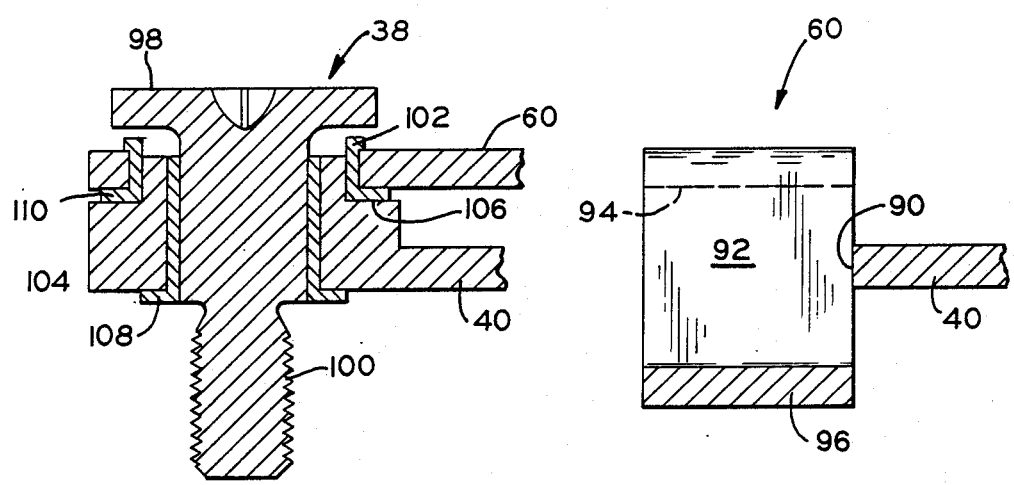
FIG. 5
FIG. 6
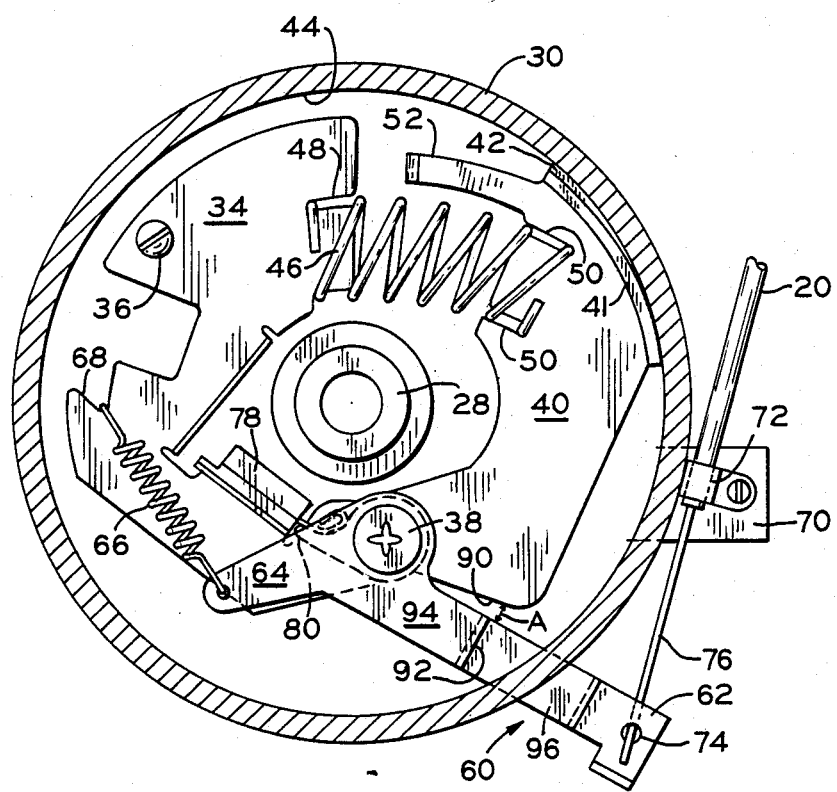
FIG. 7

COMPLIANCE BRAKE FOR AN INTERNAL COMBUSTION ENGINE POWERED IMPLEMENT

BACKGROUND OF THE INVENTION

This invention generally relates to safety devices for internal combustion powered implements and more particularly to a safety brake to promptly stop an internal combustion engine in the event that the operator moves from his normal operating position. More specifically, the present invention relates to an improved mechanical linkage which will operate without adjustment over the life of the implement regardless of the wear of the brake lining.

The need for safety devices for implements powered by internal combustion engines has long been recognized in order to reduce the possibility of injury to an operator. Many such safety devices have been provided including devices which are generally referred to as "deadman" controls. Such controls may comprise devices to interrupt the ignition circuit of the internal combustion engine as well as braking devices which operate to quickly stop the internal combustion engine when the deadman control lever is no longer actuated by the operator. Typical examples of equipment in which such controls are used are lawnmowers, garden tillers, snowblowers and the like and which require the operator to depress a lever mounted adjacent the handle of the implement to render the implement operational. In the event that the operator releases his grip on the handle, the deadman lever typically moves away from the handle to a position wherein the internal combustion engine is disabled. The braking device itself, which is operated by the deadman control lever, commonly consists of a pivoted braking lever having a friction surface which contacts a surface of the internal combustion engine flywheel when the deadman control lever is not operated. Furthermore, one or more electrical switches may be provided to selectively disable the ignition circuit of the internal combustion engine when the deadman control is in its unoperated position.

Typical examples of such prior art braking devices are provided in U.S. Pat. Nos. 4,394,893; 4,519,486 and 4,757,885 all of which are assigned to the assignee of the present invention and the disclosures of which are incorporated herein by reference. One of the problems with such prior art safety devices has been that the devices included numerous parts, levers, links and the like. This has resulted in substantial cost for the safety devices and, furthermore, has resulted in a substantial tolerance buildup in the construction of such devices thereby making them more difficult to adjust and assemble. While these prior art devices have generally been satisfactory, it is desired to provide an improved safety device having a minimum of pivot points. It is furthermore desired to provide a device wherein the linkages, at their point of interaction, abut each other without any sliding movement therebetween to prevent wear between contacting surfaces and to ensure proper operation of the device, even after extended use.

Other prior art safety braking devices have been provided wherein only a single braking lever, actuated by the deadman control was provided. While these devices had the advantage of simplicity, a problem with these prior art devices has been that, after extended use of the device and wear of the brake surfaces, the deadman control lever needed adjustment to provide a desired range of movement thereof. It is understandably undesirable for the operator to actuate the deadman control lever through a greater distance when the braking surfaces are worn than when the braking surfaces are new. It is therefore desired to provide a safety device for an internal engine powered implement wherein the range of movement of the deadman control is not dependent upon the wear of the friction brake surfaces.

An additional problem with prior art safety devices has been that adjustment of the devices for a variety of implements was not possible without affecting the operation of the device. Such adjustments of the "control effort" is adjustment of the force needed to move the control lever from the "engine disabled" position. This "control effort" also equals the force available to pull the deadman control back to its normal position. It is therefore desired to provide a safety device for an internal combustion engine powered implement wherein adjustment of the "control effort" of the device may be easily accomplished without affecting the operation of the device so that the safety device may be mounted on various implements.

SUMMARY OF THE INVENTION

The present invention, in one form thereof, overcomes the disadvantages of the above-described prior art safety devices by providing an improved safety device therefor. The safety device according to the present invention comprises a braking lever and a control lever both of which are mounted on a common pivot member. The control lever is actuated by the deadman control for actuating the braking lever and disengaging the braking surface of the braking lever from a flywheel friction surface to enable the internal combustion engine to operate.

The present invention, in one form thereof, includes a deadman control for operating a control lever. The control lever is mounted on a common pivot member together with a braking lever. The braking lever includes a friction surface for contacting an annular internal friction surface of a flywheel. The braking lever is normally urged into braking contact with the flywheel. The control lever and braking lever both include abutting surfaces whereby, when the deadman control is operated, the abutting surfaces will cause the control lever to move the braking lever out of contact with the flywheel, thereby enabling the internal combustion engine to operate. The braking lever is normally urged into braking contact with the flywheel by means of a compression spring. A tension spring is secured to the control lever for normally urging the abutting surface of the control lever out of contact with the abutting surface of the brake lever and for applying additional force to the control lever.

An advantage of the present invention is that it includes a single stationary pivot point for the linkage and therefore eliminates all sliding linkages of the safety device whereby the operation of the safety device is not dependent upon sliding friction between the various linkages. Therefore, the safety device operates reliably regardless of wear and corrosion of the various linkage members.

Another advantage of the present invention is that it involves few moving parts, thereby reducing the tolerance buildup of the linkage and making the safety device easier to adjust.

Still another advantage of the present invention is that, as the braking surfaces wear, the deadman control always returns to its same rest position regardless of the amount of wear of the brake surface. This is made possible by the use of a separate control lever which is out of contact with the braking lever when the engine is disabled and therefore always returns to the same resting position when the deadman control is not operated.

Yet another advantage of the present invention is that it involves fewer moving parts, therefore making the safety device more economical to construct.

Yet still another advantage of the present invention is that the entire device may be assembled separately and then assembled in its entirety to the internal combustion engine.

A further advantage of the present invention is that the control effort can be changed by changing the tension spring to a heavier or lighter spring to suit individual customers and that changing this spring does not affect brake performance.

The present invention, in one form thereof, comprises an internal combustion engine powered implement having a crankshaft, a flywheel secured to the crankshaft, an ignition circuit, and a deadman control normally biased toward a first position wherein the engine is inoperative. The deadman control is also actuable to a second position by an operator to enable the engine to operate. The safety device includes a single only pivot member, a braking lever pivotably mounted on the pivot member and including a first friction surface for contacting a second friction surface of the flywheel when the deadman control is in the first position. A control lever is also pivotably mounted on the pivot member and is actuable by the deadman control in its second position to contact the braking lever and to cause the braking lever to pivot and disengage the first friction surface from the second flywheel friction surface.

The present invention, in one form thereof, comprises an internal combustion engine powered implement including an internal combustion engine having a crankshaft, an ignition circuit, and a flywheel mounted on the crankshaft for rotation therewith. The flywheel has a first annular friction surface. A deadman control has a first position wherein the engine is disabled and a second position wherein the engine is enabled to be operative. A pivot member is secured to the engine and a braking lever is pivotably mounted on the pivot member. The braking lever includes a second friction surface adapted to selectively contact the first annular friction surface to disable the engine from operating when the deadman control is in its first position. A first spring is secured to the braking lever for urging the second friction surface into contact with the first annular friction surface. A control lever, connected to the deadman control, is pivotably mounted on the pivot member for contacting the braking lever and causing the braking lever to pivot against the urging action of the first spring when the deadman control is placed into its second position, whereby the second friction surface will be out of contact with the first annular flywheel friction surface, thereby enabling the engine to operate.

The present invention, in one form thereof, comprises a method for selectively enabling operation of an internal combustion engine powered implement. The method includes the steps of mounting a deadman control on the implement. The deadman control has a normal position and is actuable by an operator to a second position. A braking lever and a control lever are mounted on a single only pivot member whereby the control and braking levers may pivot independently of each other in parallel planes. A first friction surface is provided on the braking lever, the first friction surface being adapted to contact a second friction surface of the flywheel of the implement internal combustion engine when the deadman control is in the first position. First and second abutment surfaces are provided respectively on the braking lever and the control lever for enabling the actuated deadman control to cause the control lever to pivot the braking lever first friction surface out of contact with the flywheel second friction surface, whereby the engine is enabled to be operative.

It is an object of the present invention to provide a safety device for an internal combustion engine operated implement which includes only a single pivot point for the operating linkage.

Another object of the present invention is to provide a safety device for an internal combustion engine powered implement which does not have any sliding surfaces between the various linkages.

Still another object of the present invention is to provide a safety device for an internal combustion engine powered implement which uses few parts and is simple to assemble and mount.

Yet still another object of the present invention is to provide a safety device for an internal combustion engine powered implement wherein wear of the braking surfaces does not affect the rest position of the deadman control lever.

A yet further object of the present invention is to provide a safety device for an internal combustion powered implement wherein the control lever effort may be adjusted independently of the operation of the device and thereby permitting the device to be used in connection with various implements requiring various deadman control lever forces.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein:

FIG. 5 is a cross-sectional view of the pivot member assembly for the device taken along line 5—5 of FIG. 3, including a broken-away of the braking and control levers;

FIG. 6 is a cross-sectional view of the control lever taken along line 6—6 of FIG. 3; and FIG. 7 is a plan view similar to FIG. 3 with the braking surface shown as substantially worn down.

Corresponding references characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
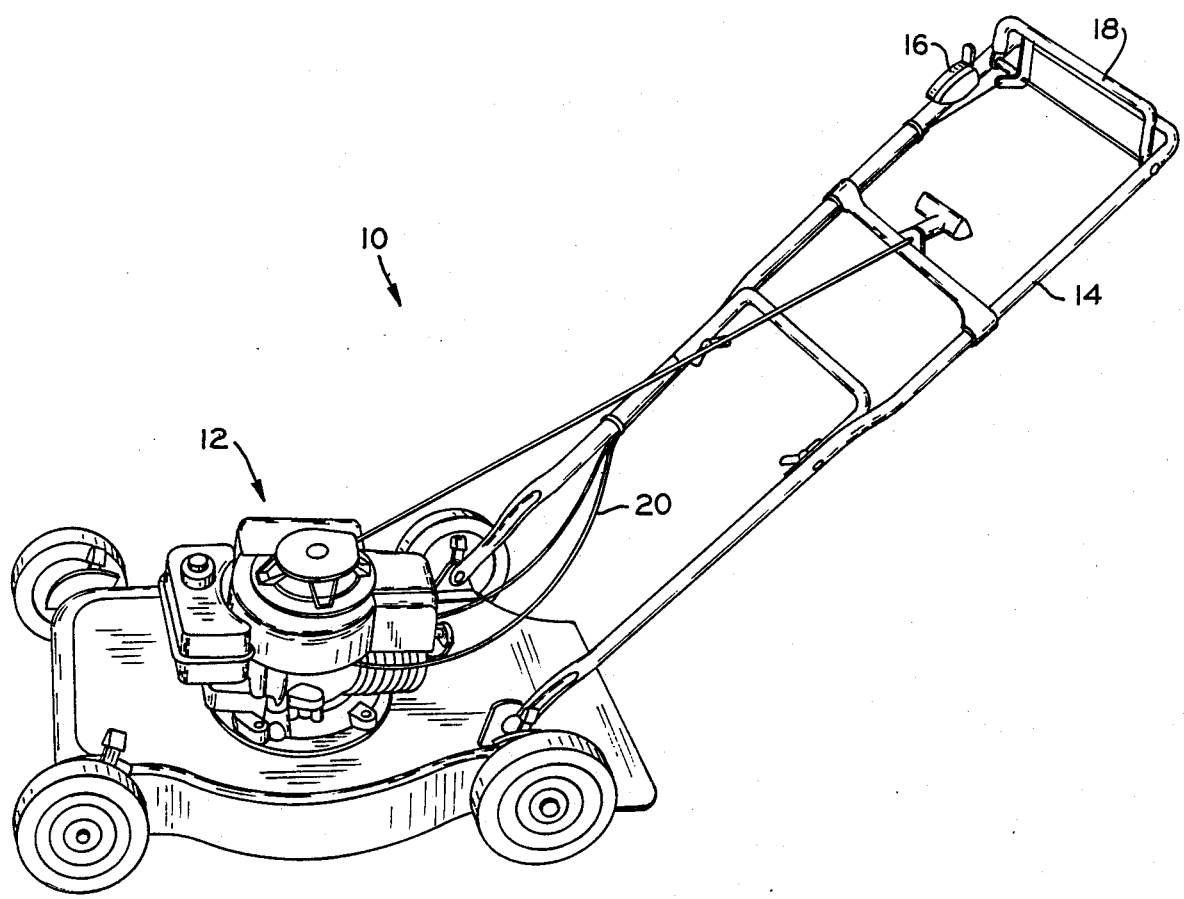
FIG. 1 is a perspective view of a lawnmower incorporating the safety device of the present invention.

Referring to FIG. 1, there is shown a lawnmower 10 including an engine 12, a handle 14 and a control 16 for controlling the speed of the engine and/or a clutch. Lever 18 is part of a deadman control that further includes a Bowden cable 20. A Bowden cable is well known in the prior art and comprises a sheath 22 and a wire 24. When deadman control lever 18 is pulled toward handle 14, wire 24 moves with respect to sheath 22 which is clamped to the body of the mower and thereby controls a linkage as further explained hereinafter. It should be noted, as further explained hereinafter, that it is preferable for lever 18 to always assume the same rest position when it is not being operated. The reason for this is that in normal operation, a person would grasp handle 14 and lever 18 and squeeze them together. If the spacing between lever 18 and handle 14 were too great, persons with small hands might not be able to operate lever 18 conveniently.

Figure 2:
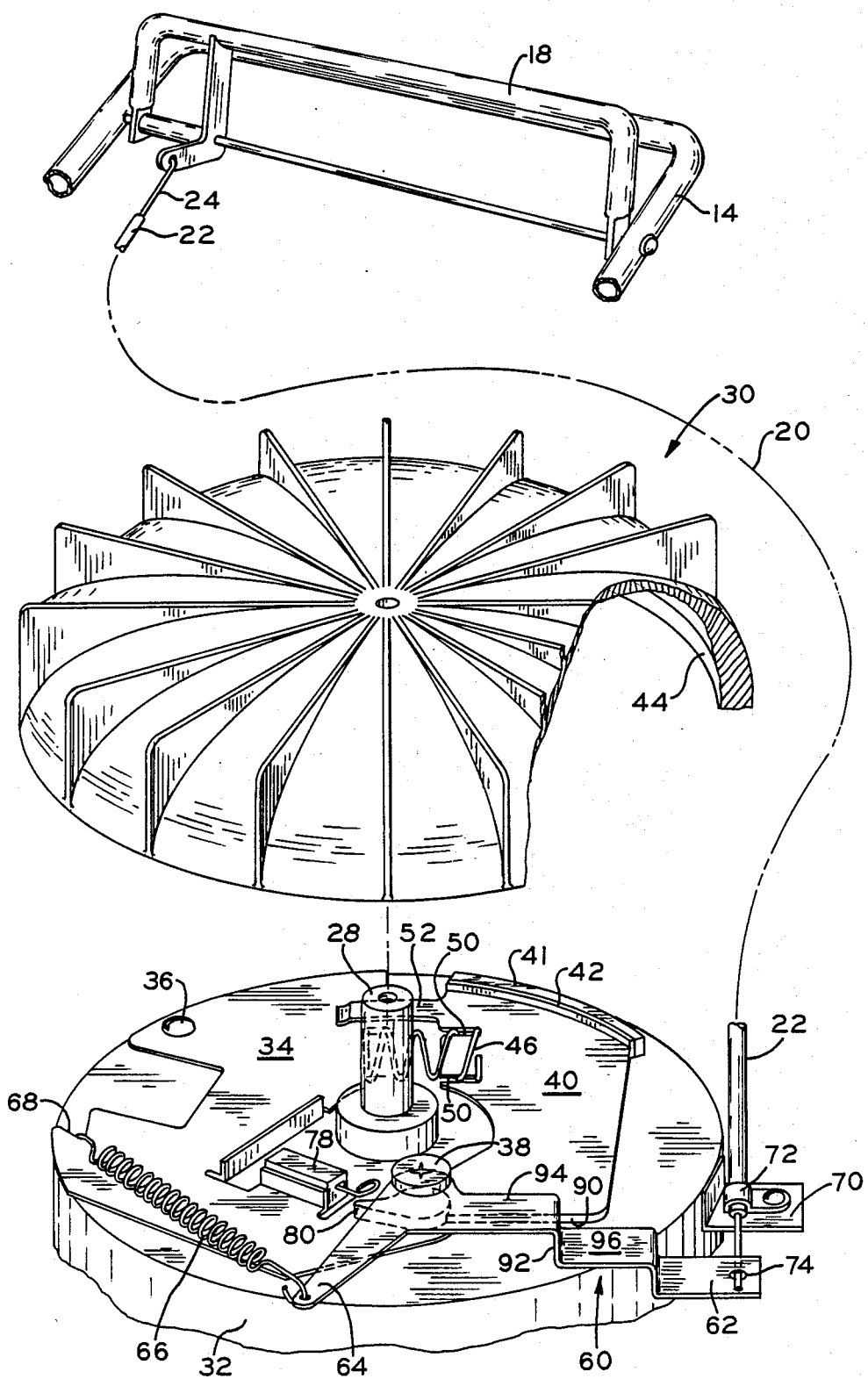
FIG. 2 is an exploded perspective view of the safety device according to the present invention.
Figure 3:
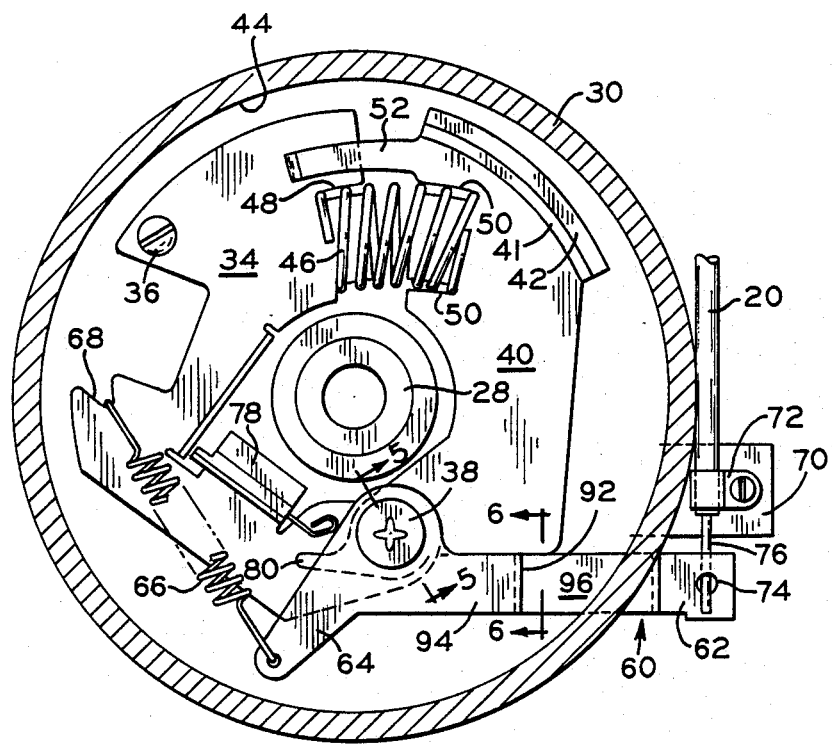
FIG. 3 is a plan view of the safety device of FIG. 2 with the flywheel removed and the braking surface out of contact with the flywheel.

Referring to FIG. 2, there is shown a crankshaft 28 of the lawnmower engine and a flywheel 30 which is fastened to the crankshaft 28. An engine block 32 is shown and a mounting bracket 34, which is secured to engine block bosses (not shown) by means of a fastener 36 and a threaded pivot member 38. A braking lever 40 is shown including an upstanding flange 41 to which a brakeshoe 42 is secured by suitable means, such as for instance by bonding with an adhesive. Flywheel 30 includes an inner annular cylindrical friction surface 44 for cooperation with brakeshoe 42 as further explained hereinafter. A compression spring 46 is shown which normally urges brakeshoe 42 into contact with flywheel friction surface 44 and thereby prevents flywheel 30 from rotating and the engine from operating. Compression spring 46 is secured in place by means of a slot 48 in mounting bracket 34 which is best shown in FIG. 3 and by means of slots 50 in braking lever 40. Thus, braking lever 40 is pivotably mounted on pivot member 38 so that the brakeshoe 42 may pivot toward or away from annular flywheel friction surface 44. Braking lever 40 is mounted in such a way that the braking action on flywheel 30 is self-actuating. Thus, when the brakeshoe is allowed to make contact with the flywheel, the direction of rotation of the flywheel will cause the brakeshoe 42 to wedge more tightly into contact with surface 44 upon further rotation of the flywheel 30 and therefore very quickly stop flywheel 30 from rotation. Spring 46 is necessary to urge braking lever 40 toward a position wherein brakeshoe 42 engages with flywheel annular friction surface 44. The brake is self-engaging but not self-locking since the spring 46 still affects brake performance and stop times. An alignment tab 52 is provided to activate a switch on electric start mower models.

A control lever 60 is also pivotably mounted on pivot member 38. As shown in FIG. 2 and further explained hereinafter, the control lever 60 is located above and separated from braking lever 40 whereby control lever 60 and braking lever 40 may pivot independently on pivot member 38. Control lever 60 includes a tab 62 which is secured to the end 76 of Bowden wire 24. End 76 of wire 24 is Z-shaped, as is conventional, and has a portion thereof projecting through an aperture 74 in tab 62. Thus, as the wire 24 is moved by the actuation of deadman control lever 18, control lever 60 will pivot on pivot member 38. The Bowden cable sheath 22 is captured by a cable clamp 72 onto a flange 70 which is secured to engine block 32.

Continuing now with FIG. 2, it should be noted that control lever 60 includes a protrusion 64 to which is secured one end of a tension spring 66. The other end of tension spring 66 is secured to a cutout portion 68 of mounting bracket 34. Thus, control lever 60 may pivot on pivot member 38 against the biasing force of tension spring 66. When deadman control lever 18 is not actuated, spring 66 will cause lever 60 to pivot in a clockwise direction and cause deadman control lever 18 to assume the position shown in FIG. 1. By referring to FIG. 4, the position of control lever 60 is illustrated when deadman control 18 is not actuated. Thus, by selecting a spring 66 with the proper spring rate and length the safety device may be adapted for various types of mowers. Since the function of spring 46 is only to cause the pivoting of braking lever 40 and since spring 46 has no effect on the rest position of deadman control lever 18, the same spring 46 may be used with various types of safety devices adapted for various mowers.

Referring further to FIG. 2, it may be seen that a switch 78 is provided which is actuated by a switch actuating flange 80 comprising a part of braking lever 40. By referring to FIG. 4 it can be seen that in the rest position of control lever 60 i.e. in the position wherein deadman actuating control lever 18 is not actuated, braking lever 40 is in a position wherein brakeshoe 42 actuates flywheel friction surface 44 and switch actuating flange 80 grounds out switch 78. Switch 78 may be in circuit with the ignition circuit for engine 12 and thus, when the flywheel is prevented from rotating by means of braking lever 40, the ignition circuit is disabled by the grounding of switch 78.

The operation of the device is illustrated in FIGS. 3–7. Control lever 60 is shaped in stairstep fashion as best seen in FIG. 2. FIG. 6 shows a cross-section of control lever 60 taken along line 6—6 of FIG. 3. Braking lever 40 includes an abutting edge 90. Thus the upstanding portion 92 of lever 60 will contact abutting edge 90 of braking lever 40 when the deadman actuating lever 18 is squeezed toward handle 14. This operation causes control lever 60 to rotate in the counterclockwise direction until control lever 60 contacts abutting edge 90 of braking lever 40, thereby causing braking lever 40 to rotate in a counterclockwise direction against the opposing force of compression spring 46, and moving brakeshoe 42 away from flywheel friction surface 44 and permitting the flywheel and crankshaft to rotate. At the same time, switch actuating flange 80 will disengage from the switch 78 thereby enabling the ignition circuit. Thus, in the position of FIG. 3, when deadman control lever 18 is depressed, the lawnmower is operative since the engine is enabled.

Figure 4:
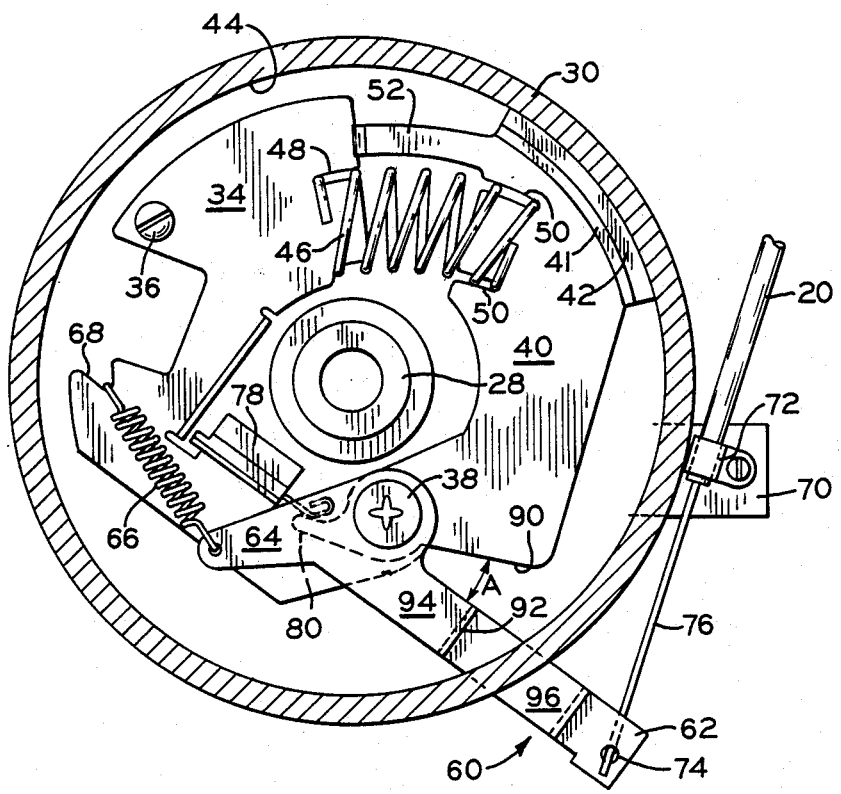
FIG. 4 is a plan view similar to FIG. 3 with the braking surface engaged the flywheel.

Referring to FIG. 4, the safety device is illustrated with control lever 18 at rest, i.e., not operated. In this position, control lever 60 has rotated clockwise under the action of biasing spring 66 whereby abutting edge 92 has moved away from abutting edge 90, thereby permitting braking lever 40 to rotate counterclockwise under the action of compression spring 46. In this position, brake shoe 42 is engaged with the friction surface 44 of flywheel 30 and switch actuating flange 80 has engaged with switch 78. Thus the flywheel 30 and crankshaft 28 are prevented from rotating and the ignition circuit is prevented from operating. In this position the safety device has disabled the lawnmower engine from operating.

Referring now to FIG. 7, the safety device is illustrated in the same position as in FIG. 4. However, in the illustration of FIG. 7, brakeshoe 42 has been worn down by repeated usage so that only a small wedge of the brakeshoe remains on flange 41. It should be noted that the space A separating abutting edges 90 and 92 in the illustration of FIG. 7 is much smaller than it is in FIG. 4, due to the wear of brakeshoe 42. However, it should also be noted that abutting edge 92 is still completely separated from abutting edge 90 whereby brakeshoe 40 is free to rotate until the thin brakeshoe 40 makes full braking contact with friction surface 44 of flywheel 30. The position of lever 60 in FIG. 7 is identical to the position of lever 60 in FIG. 4 so that the position of deadman control lever 18 is the same in both figures. Thus the amount of wear of the brakeshoe 42 has no effect on the rest position of deadman control lever 18.

Referring now to FIG. 5, pivot member 38 is illustrated. Pivot member 38 includes a screw head 98 which is adapted to engage with a Phillips screwdriver. Shaft 100 of pivot member 38 is threaded and thereby serves to secure mounting bracket 34 to engine block 32. A bushing 104 made of nylon or other suitable material is used to mount braking lever 40 on pivot member 38. Bushing 104 includes a flange 108 which supports braking lever 40. Thus braking lever 40, due to the lubricating properties of nylon or similar suitable materials, is free to rotate about pivoting member 98. Furthermore, very little wear of braking lever 40 will occur because of the use of nylon bushing 104. A second bushing 102 made of nylon or other suitable material is provided which is mounted on a shoulder 106 of braking lever 40. Bushing 102 supports control lever 60 whereby control lever 60 may rotate independently of braking lever 40 around pivot member 38. A flange 110 of bushing 102 is supported on shoulder 106.

Thus, by virtue of the use of a single pivoting member 38 which permits independent pivoting movement of control lever 60 and braking lever 40, it can be seen that a reliable safety device has been provided. Regardless of the wear of levers 60, 40 or any of the other linkage members, the use of abutting edges 90 and 92 ensures the disablement of the engine when the deadman lever is not actuated. Furthermore, the safety device positively enables operation of the implement when lever 18 is operated. Furthermore, by the use of very few linkages, the operation of the device is reliable and the device is very economical to construct. Lastly, by virtue of the use of the mounting bracket 34, the entire safety device may be manufactured as a subassembly and then assembled in its entirety on the engine.

An important aspect of the invention is the adjustability of the "control effort" by means of spring 66. By selecting a spring 66 with different parameters, such as the spring constant, the "control effort", namely the force necessary to move the control lever 18 from the "engine disabled" to "engine enabled" positions, may be adjusted to suit the needs of various implements and operators without affecting operation of the safety device in disabling the implement.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In an internal combustion engine powered implement having a crankshaft, a flywheel secured to said crankshaft, and a deadman control normally biased toward a first position wherein the engine is inoperative, said deadman control being actuable to a second position by an operator to enable said engine to operate, a safety device comprising:
   a single only pivot means;
   a braking lever pivotably mounted on said pivot means and including a first friction surface for contacting a second friction surface of said flywheel when said deadman control is in said first position; and
   a control lever means pivotably mounted on said pivot means and actuable by said deadman control in said second position to contact said braking lever and cause said braking lever to pivot and disengage said first friction surface from said second flywheel friction surface, said braking lever and said control lever means being coaxially pivotable relative to each other.

2. The implement according to claim 1 and including a first biasing spring means for urging said braking lever to pivot and force sad first friction surface into engagement with said second friction surface, and a second biasing spring means for urging said control lever means to pivot out of contact with said braking lever.

3. The implement according to claim 1 wherein said braking lever and control lever means pivot in substantially parallel planes.

4. The implement according to claim 1 wherein said flywheel second friction surface comprises an inner cylindrical surface of said flywheel.

5. The implement according to claim 2 including a mounting bracket secured to said engine by said pivot means and including means for attachment of said first and second biasing spring means to said bracket.

6. The implement according to claim 2 wherein said first biasing spring means is a compression spring.

7. The implement according to claim 2 wherein said second biasing spring means affects the control effort required to actuate said deadman control to said second position.

8. The implement according to claim 1 including an electrical switch means actuable by said braking lever when said deadman control is in said first position for electrically disabling said engine.

9. The implement according to claim 1 wherein said pivot means includes means for permitting independent pivoting of said braking lever and control lever means.

10. The implement according to claim 9 wherein said independent pivoting means comprises a pair of bushings.

11. An internal combustion engine powered implement comprising:
   an internal combustion engine having a crankshaft and a braking member connected to said crankshaft for rotation therewith, said braking member having a first friction surface;
   a deadman control having a first position wherein said engine is disabled and a second position wherein said engine is enabled to be operative;
   a pivot means secured to said engine;

a braking lever pivotably mounted on said pivot means and including a second friction surface adapted to selectively contact said first friction surface to disable said engine from operating when said deadman control is in said first position;

a first spring means secured to said braking lever for urging said second friction surface into contact with said first friction surface; and a control lever means connected to said deadman control and pivotably mounted on said pivot means for contacting said braking lever and causing said braking lever to pivot against the urging action of said first spring means when said deadman control is placed into its second position whereby said second friction surface will be out of contact with said first friction surface, thereby enabling said engine to operate, said braking lever and control lever means being coaxially pivotable relative to each other.

12. The implement according to claim 11 wherein said braking member comprises a flywheel and first friction surface comprises an inner cylindrical surface of said flywheel.

13. The implement according to claim 11 including a mounting bracket secured to said engine by said pivot means and including means for attachment of said first spring means to said bracket.

14. The implement according to claim 11 wherein said first spring means is a compression spring.

15. The implement according to claim 11 including an electrical switch means actuated by said braking lever when said deadman control is in said first position to disable electrically said engine.

16. The implement according to claim 17 wherein said pivot means comprises a post means fastened to said engine and said pivot means further comprises a pair of bushings on said pivot means.

17. The implement according to claim 11 including a second biasing spring means for urging said control lever means out of contact with said braking lever when said deadman control is in said first position and for applying additional force to said control lever means in order to adjust the control effort to operate said deadman control.

18. In an internal combustion engine powered implement having an deadman control that has a normal position which is actuable by an operator to a second position and a pivotable braking lever spring biased into engagement with a rotatable braking member connected to the crankshaft of the engine when the deadman control is released to the normal position, a method for selectively enabling operation of the engine comprising: moving the deadman control from the normal position toward the second position to thereby cause a pivotable control lever connected to the deadman control to rotate from a first position wherein the control lever is not in abutment with the braking lever to a second position wherein the control lever is in abutment with the braking lever and thereby cause the braking lever to also rotate coaxially with the control lever until the braking lever disengages from the braking member.

19. The method of claim 18 wherein the engine is electrically disabled when the deadman control is in the normal position, and including the step of electrically enabling the engine by the rotation of one of the control or braking levers.

20. The method of claim 18 wherein the control and braking levers rotate without any sliding action between them at the point of abutment.

21. In an internal combustion engine powered implement having a crankshaft, a flywheel secured to said crankshaft, an ignition circuit, and a deadman control normally biased toward a first position wherein the engine is inoperative, said deadman control being actuable to a second position by an operator to enable said engine to operate, a safety device comprising:

a single only pivot means;

a braking lever pivotably mounted on said pivot means and including a first friction surface for contacting a second friction surface of said flywheel when said deadman control is in said first position; and a control lever means pivotably mounted on said pivot means and actuable by said deadman control in said second position to contact said braking lever and cause said braking lever to pivot and disengage said first friction surface from said second flywheel friction surface, said braking lever and said control lever means being coaxial, said control lever means and braking lever respectively including first and second abutment surfaces, said first abutment surface directly contacting said second abutment surface in the second position of said deadman control.

22. An internal combustion engine powered implement comprising:

an internal combustion engine having a crankshaft and a braking member connected to said crankshaft for rotation therewith, said braking member having a first friction surface;

a deadman control having a first position wherein said engine is disabled and a second position wherein said engine is enabled to be operative;

a pivot means secured to said engine;

a braking lever pivotably mounted on said pivot means and including a second friction surface adapted to selectively contact said first annular friction surface to disable said engine from operating when said deadman control is in said first position;

a first spring means secured to said braking lever for urging said second friction surface into contact with said first friction surface; and a control lever means connected to said deadman control and pivotably mounted on said pivot means for contacting said braking lever and causing said braking lever to pivot against the urging action of said first spring means when said deadman control is placed into its second position whereby said second friction surface will be out of contact with said first friction surface, thereby enabling said engine to operate, said control lever means and braking lever, respectively, including first and second abutment surfaces for mutual abutment therebetween in the second position of said deadman control.

23. An internal combustion engine powered implement comprising:

an internal combustion engine having a crankshaft, and a braking member connected to said crankshaft for rotation therewith, said braking member having a first friction surface;

a deadman control having a first position wherein said engine is disabled and a second position wherein said engine is enabled to be operative;

a pivot means secured to said engine;

a braking lever pivotably mounted on said pivot means and including a second friction surface adapted to selectively contact said first annular friction surface to disable said engine from operating when said deadman control is in said first position;

a first spring means secured to said braking lever for urging said second friction surface into contact with said first friction surface; and a control lever means connected to said deadman control and pivotably mounted on said pivot means for contacting said braking lever and causing said braking lever to pivot against the urging action of said first spring means when said deadman control is placed into its second position whereby said second friction surface will be out of contact with said first friction surface, thereby enabling said engine to operate, said pivot means including means for permitting independent pivoting of said braking lever and control lever means.

* * * * *